(12) United States Patent
Remericq

(10) Patent No.: US 6,846,145 B2
(45) Date of Patent: Jan. 25, 2005

(54) PROCESS AND A DEVICE FOR THE ON-LINE STORAGE OF SETS OF FLAT PRODUCTS SUCH AS, IN PARTICULAR, DISPOSABLE LINERS OR SANITARY NAPKINS

(75) Inventor: Maurice Remericq, Comines (FR)

(73) Assignee: Societe Industrielle d'Etudes et de Realisations Electriques et Mecaniques S.I.E.R.E.M. Societe Anonyme, Comines (FR)

(*) Notice: Subject to any disclaimer, the term of this patent is extended or adjusted under 35 U.S.C. 154(b) by 183 days.

(21) Appl. No.: 10/047,907

(22) Filed: Jan. 15, 2002

(65) Prior Publication Data

US 2002/0106271 A1 Aug. 8, 2002

(51) Int. Cl.⁷ ................................................ B65G 1/10
(52) U.S. Cl. .................. 414/331.04; 198/594; 198/812
(58) Field of Search ................................ 198/812, 594; 414/331.04

(56) References Cited

U.S. PATENT DOCUMENTS

| | | | | |
|---|---|---|---|---|
| 1,935,409 A | * | 11/1933 | Mudd ....................... | 198/419.1 |
| 3,655,180 A | * | 4/1972 | Holler ....................... | 270/58.21 |
| 3,907,473 A | * | 9/1975 | de Mets ..................... | 425/141 |
| 4,101,370 A | * | 7/1978 | Russell ...................... | 156/555 |
| 4,325,475 A | * | 4/1982 | Spalding .................... | 198/429 |
| 4,513,858 A | * | 4/1985 | Fellner et al. .............. | 198/812 |
| 5,421,951 A | * | 6/1995 | Troutner et al. ............ | 156/580 |
| 5,960,927 A | * | 10/1999 | Bahr ......................... | 198/347.1 |
| 5,979,145 A | * | 11/1999 | Louis et al. ................ | 53/439 |

* cited by examiner

Primary Examiner—Thomas J. Brahan
(74) Attorney, Agent, or Firm—Harrison & Egbert

(57) ABSTRACT

A process and a device for the on-line storage of sets of flat products such as, in particular, disposable liners or sanitary napkins, in which said products are transported between one or more input stations and one or more output stations. The sets are introduced at a given input rate at input station or stations between a pressing device, capable of moving with the sets, the pressing device being in a first, so-called open, configuration. The products are pressed against one another by causing the pressing device to change over from their open configuration to a second, so-called product holding, configuration. The sets are directed towards the output station or stations at which they are ejected, at a given output rate, adapted as a function of the input rate, to manage an accumulation of sets between the input station or stations and the output station or stations.

12 Claims, 6 Drawing Sheets

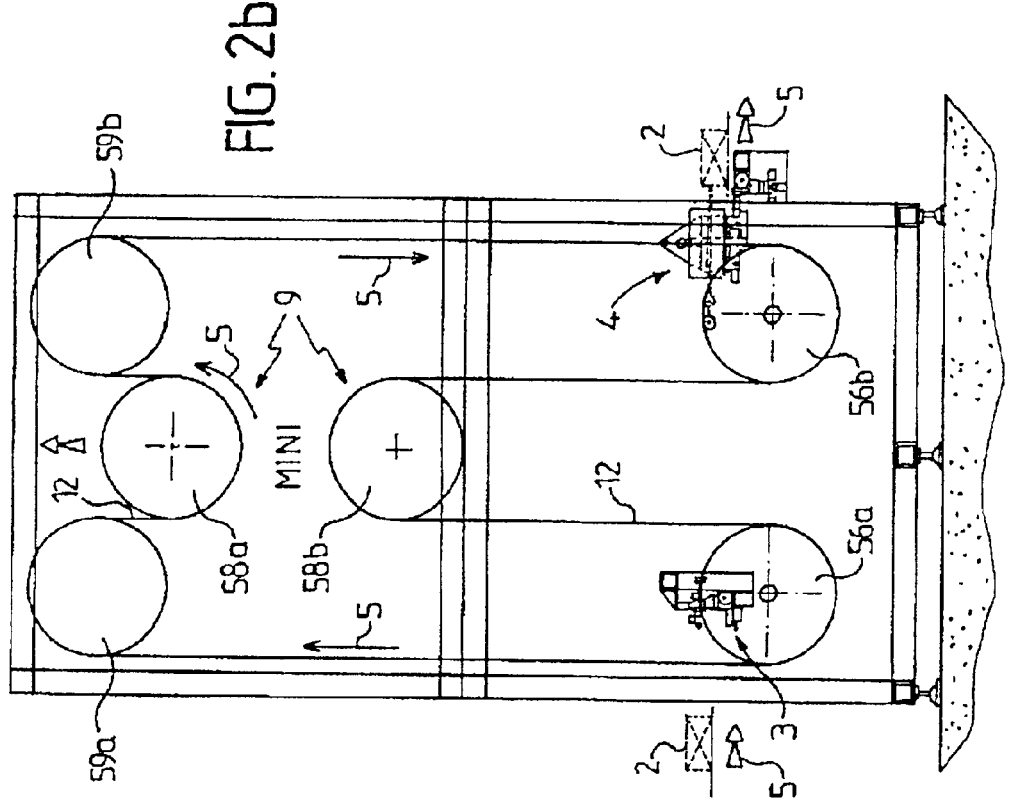
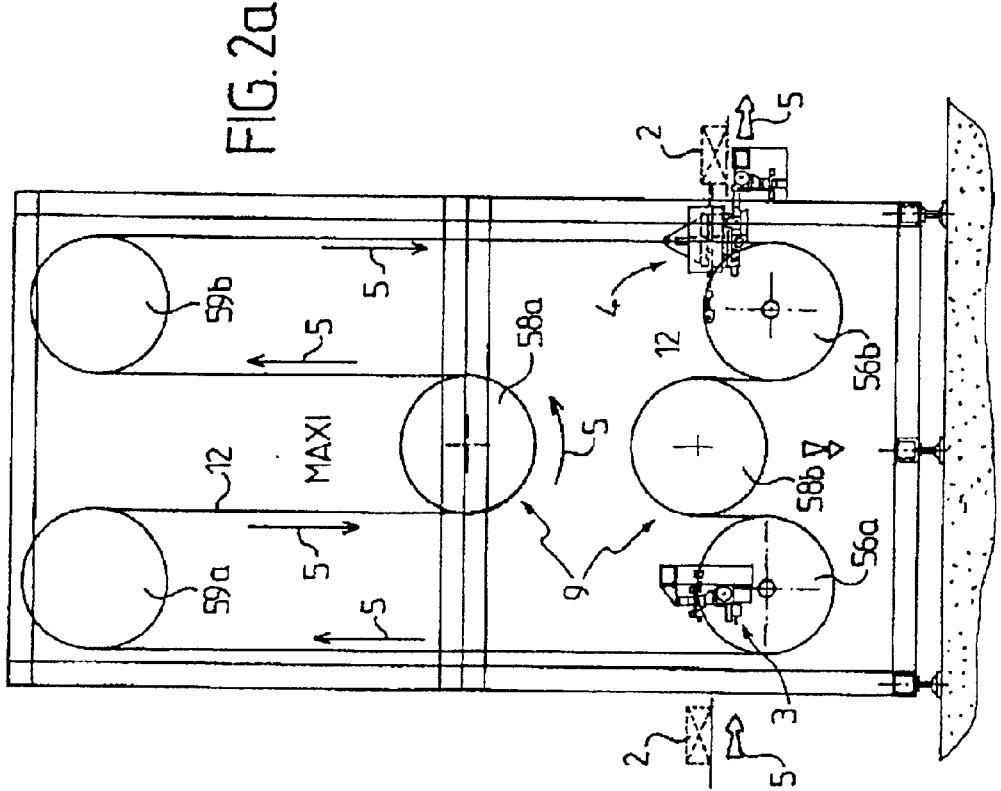

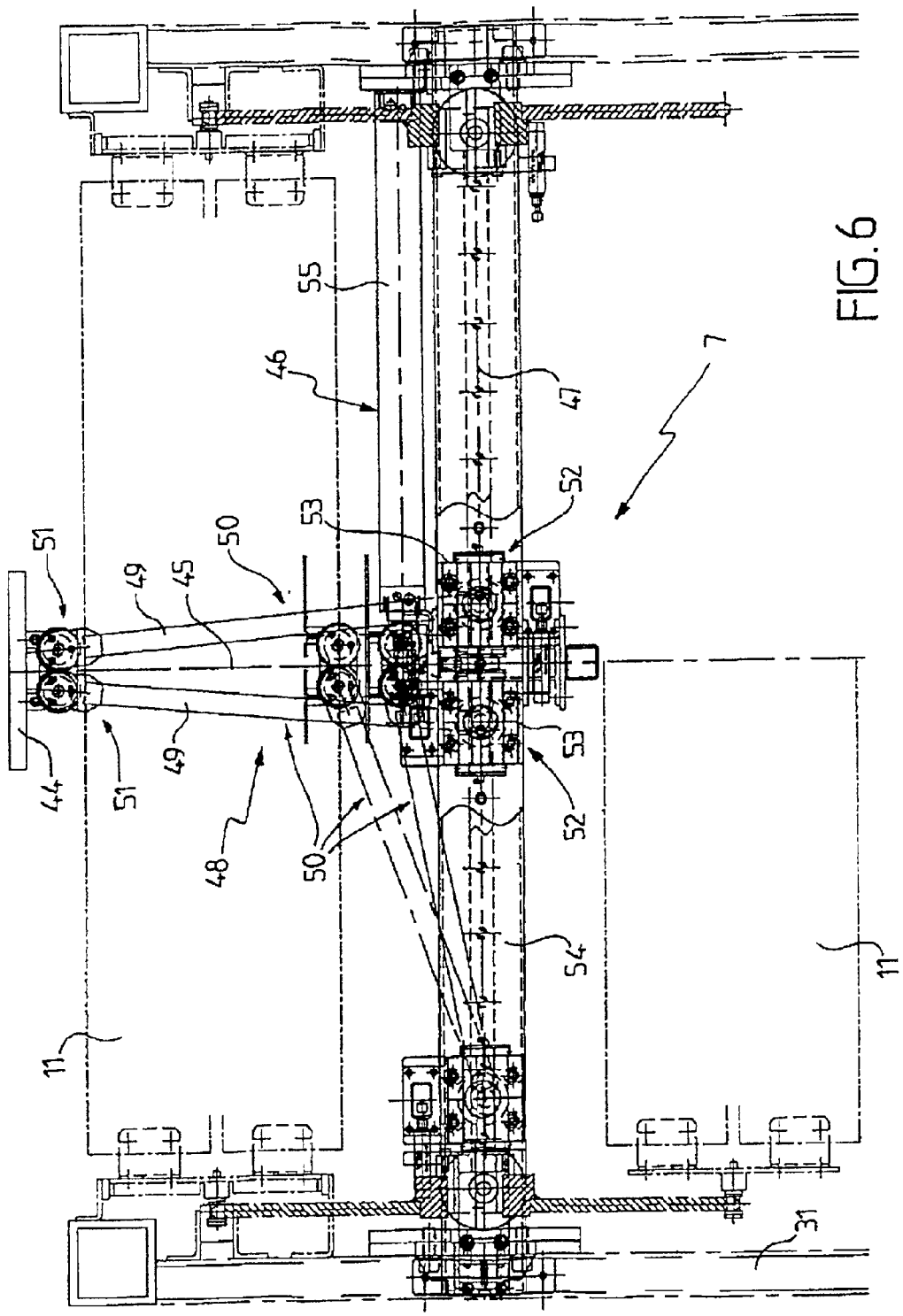

PROCESS AND A DEVICE FOR THE ON-LINE STORAGE OF SETS OF FLAT PRODUCTS SUCH AS, IN PARTICULAR, DISPOSABLE LINERS OR SANITARY NAPKINS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a process and a device for the on-line storage of sets of flat products such as, in particular, disposable liners or sanitary napkins.

However, although more especially designed for such applications, the invention can also be used with any other type of flat product.

BACKGROUND OF THE INVENTION

As known, disposable liners or sanitary napkins are continuously manufactured one by one, and then grouped together in sets before being directly packed. Any problem occurring in connection with the packing unit thus soon has effects upstream and, even when the delay is minimal, the manufacturing unit has to be halted.

This gives rise to several drawbacks. In the first place, a large number of products obtained after a restart have to be rejected owing to their inconsistent quality. Such halts are also detrimental to the equipment used, which is designed for continuous operation.

BRIEF SUMMARY OF THE INVENTION

The object of the present invention is to remedy the aforementioned drawbacks, without adversely affecting production rates. To achieve this, a first solution would be to store the products on-line, just downstream of the manufacturing unit. However, as, at this stage, the products travel one by one, this would necessitate voluminous facilities in order to obtain a significant result.

According to the invention, it is proposed to store the products after they have been grouped together in sets.

The invention thus relates to a process for the on-line storage of sets of flat products such as, in particular, disposable liners or periodic napkins, in which said products are transported between one or more input stations, at which said sets are introduced at a given input rate, and one or more output stations, at which said sets are ejected at a given output rate, and in which the output rate is adapted as a function of the input rate to manage an accumulation of sets between said input station or stations and said output station or stations.

In addition, to avoid causing the sets to be deformed, provision is made for effecting their introduction at the input station or stations between pressing means, capable of moving with said sets, said pressing means being in a first, so-called open, configuration, and then pressing said products against one another by causing said pressing means to change over from their open configuration to a second, or so-called product holding, configuration, before directing them to said output station or stations.

To solve the aforementioned problems, the invention also provides a device for the on-line storage of sets of flat products such as, in particular, disposable liners or periodic napkins, including one or more input stations and one or more output stations for said sets, as well as means for conveying said sets between said input station or stations and said output station or stations, said device further including:

pressing means, capable of moving with said set conveying means, said pressing means being capable of changing over from a first, so-called open, configuration, permitting the introduction of the sets into said conveying means at a given input rate, to a second, or so-called product holding configuration, in which the products are pressed against one another, means for causing said pressing means to change over from their open configuration to their product holding configuration, provided at said input station or stations, means for ejecting the sets, provided at said output station or stations for the departure of the sets at a given output rate, means for handling an accumulation of the sets between the input station or stations and the output station or stations, as a function of the input and/or output rate.

According to one particular form of embodiment of the invention, the conveying means include a plurality of pods, each said pod being capable of accommodating at least one said set, while said pressing means are constituted by two carriages sliding in the same, so-called, clamping, direction, on said pod, and by means for holding said carriages apart by a given interval, said means for holding the carriages being themselves constituted by first and second blocking means, capable of engaging with one another, the first blocking means being secured to said carriage and the second blocking means being articulated in relation to said pod, as well as by locking means, borne by the pod, said locking means being capable of forcing the engagement of said second blocking means in said first blocking means.

Such a form of embodiment has the advantage of facilitating the adaptation of the conveying means to the handling of sets of different sizes.

It may be noted, moreover, that such conveying and pressing means can be used in other devices for conveying flat products such as, in particular, off-line storage devices.

According to another particular form of embodiment of the invention, said ejection means include a thrust bearing and means for displacing said thrust bearing in first direction, constituted by means capable of generating a force in a second direction, substantially perpendicular to said first direction, and by means for transmitting said force, cooperating with said thrust bearing, said transmission means being, themselves, constituted by two arms, forming the two equal sides of an isosceles triangle, the axis of symmetry of which is defined by said first direction, and by means for bringing together/separating said arms by deforming said triangle, while maintaining its properties as an isosceles triangle and the orientation of its axis of symmetry.

Such a form of embodiment yields ejection means with limited space requirements.

It may be noted, moreover, that, as in the preceding case, said ejection means can be used in other conveying devices such as, in particular, devices for off-line storage.

BRIEF DESCRIPTION OF THE SEVERAL VIEWS OF THE DRAWINGS

The invention and its different advantages will be more readily understood from a study of the following description, accompanied by the annexed drawings.

FIGS. 2a and 2b are schematic views of FIG. 1, the device according to the invention being in two different conditions.

FIG. 6 is a top view of the output station of the device of FIG. 1.

DETAILED DESCRIPTION OF THE INVENTION

The invention relates, first of all, to a process for storing sets of flat products.

Figure 1:
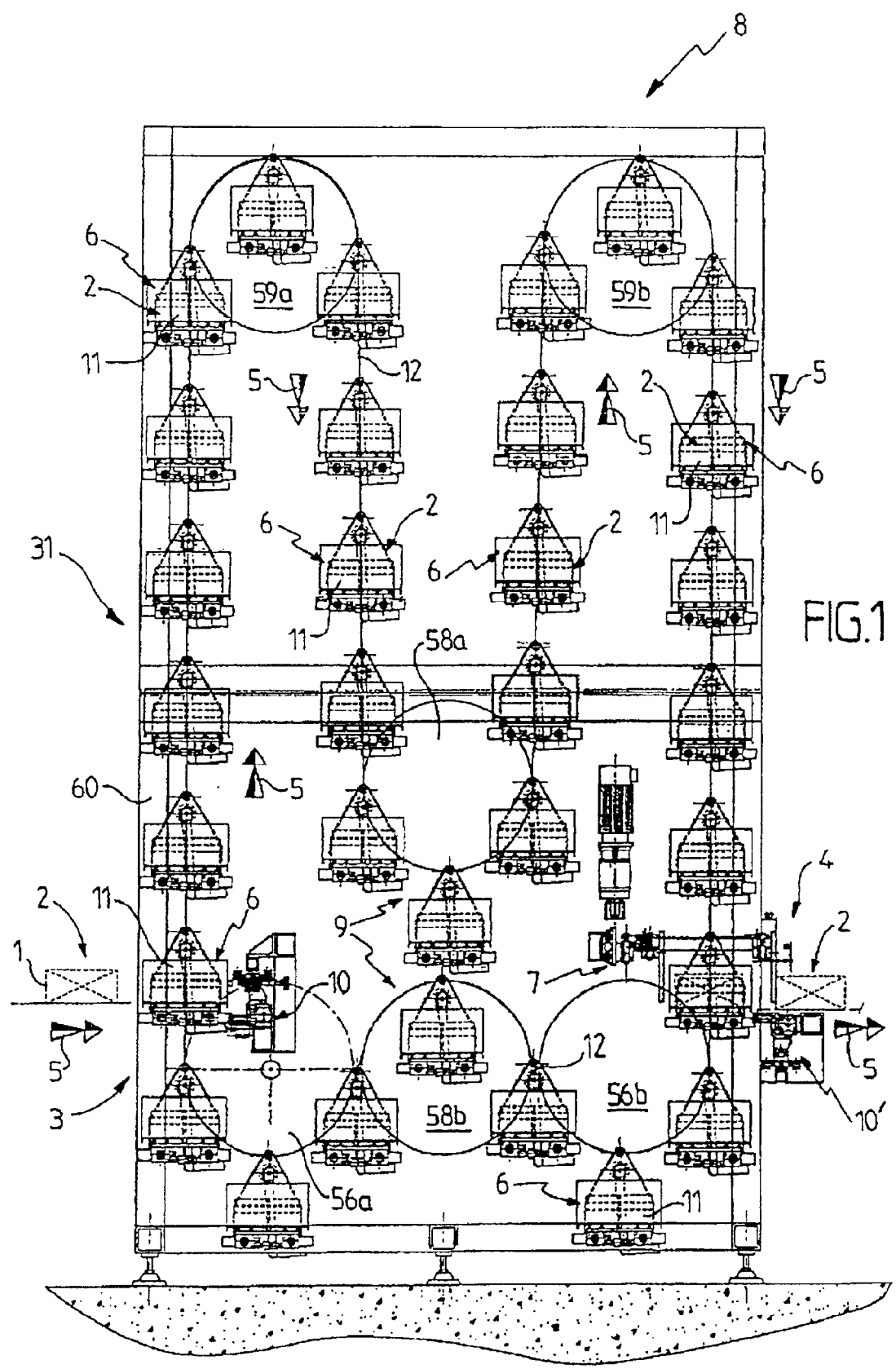
FIG. 1 is a side plan view illustration of an exemplary embodiment of the device according to the invention.

As illustrated in FIGS. 1 and 2, according to said process, said products 1 are conveyed, grouped together in the form of sets 2, between one or more input stations 3 and one or more output stations 4, at which they are ejected at a given output rate. According to the example shown, the path of the sets 2 is indicated by arrows 5.

In said sets 2, said products 1 are positioned, for example, face to face, against one another. In the case of products 1 of a substantially rectangular shape, sets 2 can be of a substantially parallelepipedic shape. Said products 1 travel, in particular, on their edges.

To compensate for the effects of production accidents that may occur upstream of input station or stations 3 and/or downstream of output station or stations 4, the output rate of sets 2 is adapted to their arrival rate. It is thus possible to manage an accumulation of sets 2 between said input station or stations 3 and said output station or stations 4. More precisely, if the output rate is less than the input rate, an accumulation of sets 2 is then created, until the situation returns to normal and the two flow rates become equal once more. With an output rate higher than the input rate, the accumulation can be absorbed without it having been necessary to halt production.

Of course, as long as no accident occurs, the input and output rates can be held at the same level with a minimum, or even zero, accumulation of sets.

There is thus obtained a process for the on-line storage of products 1, which is all the more efficient in that these have already been grouped together in sets.

As more particularly illustrated in FIGS. 2a and 2b, to handle said accumulation, said sets 2 are, for example, caused to flow between the input station or stations 3 and the output station or stations 4 along a path the length of which varies according to the input and/or output flow rate.

When the input rate is greater than the output rate, the path lengthens to arrive at a maximum number of accumulated sets, as in FIG. 2a. In the contrary case, the length of the path shortens to arrive at a minimum number of accumulated sets, as illustrated in FIG. 2b. In the case of equal flow rates, the path length is constant.

According to this solution, it is possible to operate with fixed input stations 3 and/or output stations 4 and with sets 2 kept apart from one another by a constant interval.

Figure 3:
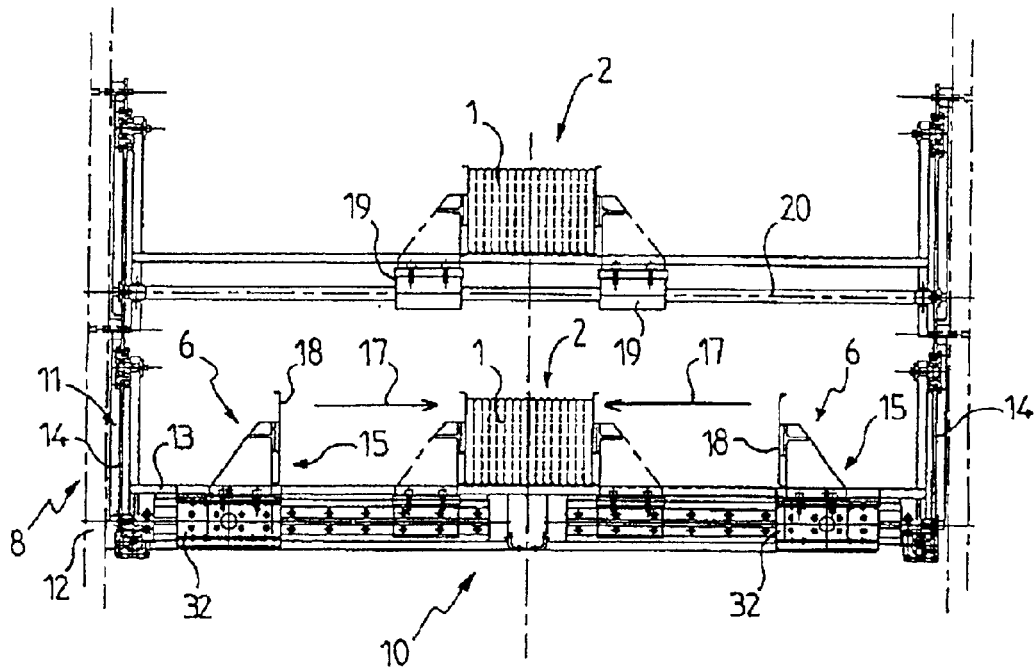
FIG. 3 is a front plan view of the input station of the device of FIG. 1, representing certain parts of the invention.

This being the case, as illustrated in FIG. 3, said sets 2 are introduced at input station or stations 3 between pressing means 6, capable of moving with said sets 2, said pressing means 6 being in a first, so-called open configuration, illustrated in solid lines, and then the products 1 are pressed against one another by causing said pressing means 6 to change over from their open configuration to a second, or so-called product holding configuration, illustrated in dotted lines, before directing said sets 2 to said output station or stations 4.

In this way it is possible to prevent products 2 from being deformed during transport, without having to attach products 1 together, the latter being held against one another by pressing means 6, from their departure from input station or stations up to their arrival at output station or stations 4.

At said input station or stations 3, said products 1 are pressed against one another, for example in a direction substantially orthogonal to their faces.

At said output station or stations 4, products 1 are ejected while they are still, possibly, pressed against one another.

In order to be able to process streams of sets of varying sizes, that is to say, for example, sets containing a greater or smaller number of flat products 1, said holding configuration can be adapted according to the size of the sets to be conveyed.

With further reference to FIG. 1, it will be noted that said pressing means 6 can be caused to travel in a loop by directing them, after the sets have been ejected, from said output station or stations 4 to said input station or stations 3. Operation then takes place in a closed circuit, which makes it possible to limit the number of pressing means 6 to be used.

According to this form of embodiment, it will, of course, be necessary to cause said pressing means 6 to change over from their product holding configuration to their open configuration. As mentioned earlier, such an operation takes place at the soonest, for example, after the sets conveyed have been ejected. At the latest, it will take place at the input station or stations 3.

The invention also relates to a device for the on-line storage of sets of flat products designed, in particular, to implement the process described earlier.

Said device includes one or more input stations 3, capable of receiving said sets 2 at a given input rate and one or more output stations 4, capable of permitting their departure at a given output rate thanks to ejection means 7. It further includes means 8 for conveying said sets 2 between input station or stations 3 and output station or stations 4, as well as means 9 for handling an accumulation of sets 2 between input station or stations 3 and output station or stations 4, as a function of the input rate and/or the output rate. It thus enables reserves of products to be formed, on-line.

Furthermore, to prevent the sets from being deformed, said device includes:

pressing means 6, capable of moving with said means 8 for conveying the sets, said pressing means being capable of changing over from a first, so-called open, configuration, permitting the introduction of the sets into said conveying means at the input rate, to a second, so-called product holding, configuration, in which the products are pressed against one another, means 10 for causing said pressing means to change over from their open configuration to their product holding configuration, provided at said input station or stations 3.

Said conveying means 8 take, for example, a looped path. Said device then include means 10' for causing said pressing means to change over from their product holding configuration to their open configuration, provided in the direction of progress of conveying means 8, between said output station or stations 4 and said input station or stations 3 and/or at said stations.

According to the form of embodiment illustrated, said means 10' for causing the pressing means 6 to change over from their holding configuration to their open configuration are provided at said output station or stations 4.

According to another form of embodiment, said means 10' for causing said pressing means 6 to change over from their holding configuration to their open configuration could be constituted by the actual means 10 for causing pressing means 6 to change over from their open configuration to their product holding configuration, the operation of the latter being designed to be reversible. Pressing means 6 are then actuated at the same station.

Said conveying means 8 include, for example, a plurality of pods and/or at least one belt 12 for driving said pods, each said pod being capable of accommodating at least one said set 2.

Figure 5:
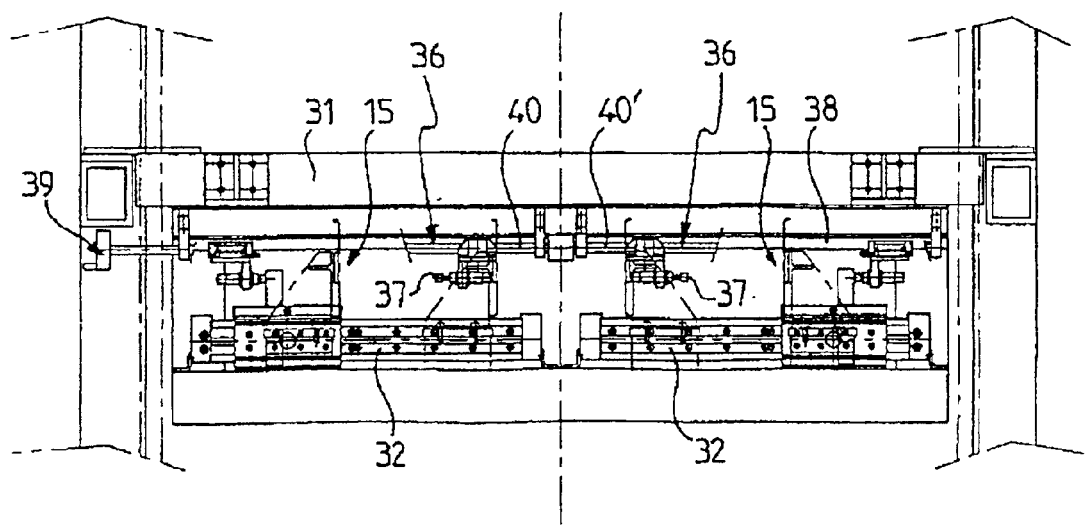
FIG. 5 is another schematic view of FIG. 3, showing other parts of the invention.

As illustrated in FIGS. 3 to 5, said pods are constituted by a support plate 13, in particular substantially rectangular, on which are placed sets 2, and/or by two side members 14, located on either side of said support plate 13. There are provided, for example, two said belts 12, each connected to one of side members 14.

The pressing means 6 are constituted, for example, by two carriages 15 sliding toward each other direction, on said pod 11, and by means 16 for holding the carriages 15 spaced apart by a given distance. In FIG. 3, the spacing between carriages 15 shown in solid lines corresponds to the open configuration, while the spacing between the carriages shown in dotted lines corresponds to the product holding configuration. The clamping direction is indicated by reference number 17.

Said carriages 15 are constituted, in particular, by a pressure plate 18, designed to be located opposite the outer face of product 1 at one of the ends of sets 2, and/or by a block 19 for supporting said pressure plates 18. The latter are orientated, for example, substantially perpendicularly to said direction of clamping 17. Their said support block 19 slides, thanks to bearing ball contacts, over guide rails 20, through a slot 21 provided in said support plate 13. Said guide rails 20 and said slot 21 are also orientated in said clamping direction 17.

Carriages 15 are both designed to be mobile so as to be able to remain symmetrically disposed in relation to the middle of the pod, whatever their spacing.

Figure 4A:
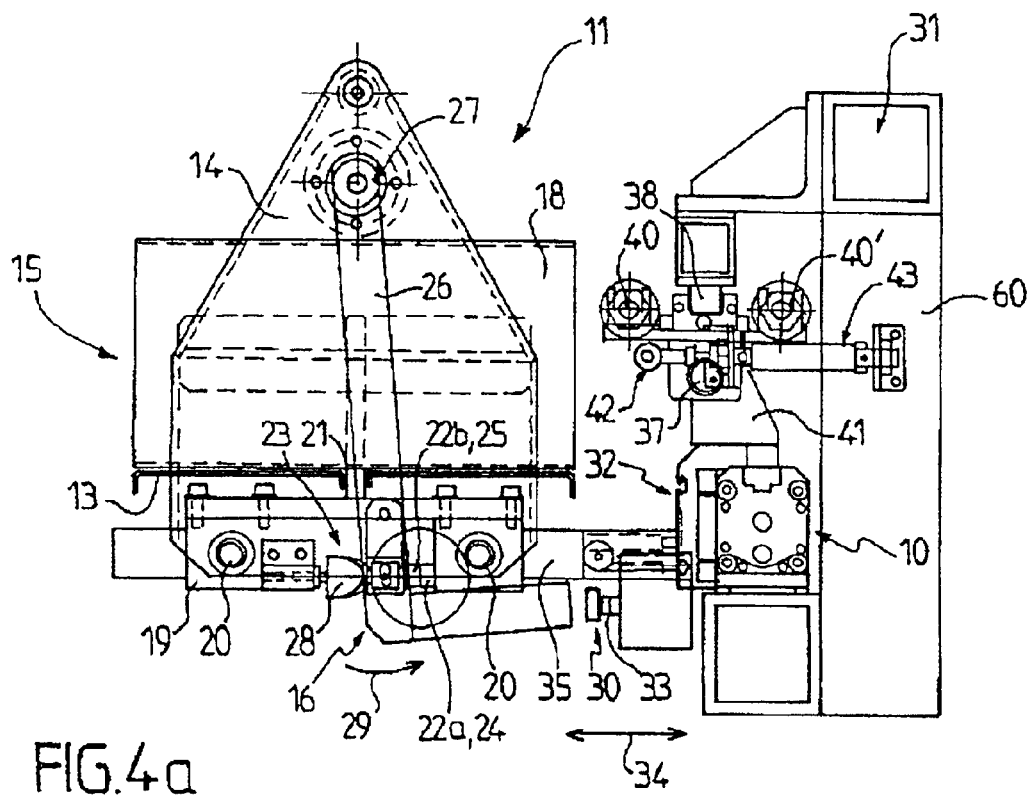
FIGS. 4a and 4b are side plan views of the input station of the device of FIG. 1, illustrated in two different conditions, some of the parts being shown in transparency.
Figure 4B:
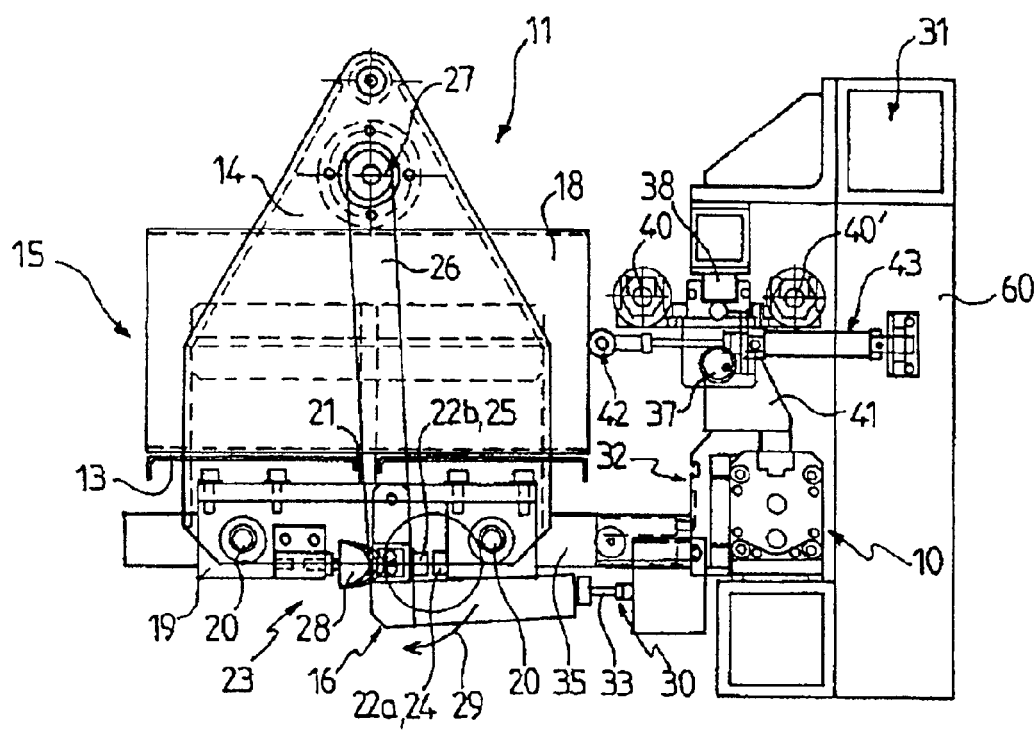

As more especially illustrated in FIGS. 4a and 4b, said means 16 for holding carriages 15 are constituted, in particular, by first and second blocking means 22a, 22b, capable of engaging with one another, first blocking means 22a being secured to said carriage 15 and second blocking means 22b being articulated in relation to said pod 11. Said means 16 for holding the carriages are also constituted by locking means 23 borne by pod 11, said locking means 23 being capable of forcing the engagement of said second blocking means with said first blocking means 22a.

Said first blocking means 22a are constituted, for example, by rack rails 24 secured to blocks 19 of carriages 15 and of a size corresponding to that of said blocks, while second blocking means 22b are constituted by another rack rail 25, capable of coming into engagement with rack rails 24 of blocks 19. Said rack rail 25 of second blocking means 22b extends longitudinally beneath support plate 13 of said pod 11 opposite which it is articulated via arms 26, connected to each of its ends, said arms being mounted on pivots 27 located in the area of side members 14 of said pods 11.

Said rack rails 24, 25 of said first and second blocking means 22a, 22b are orientated, for example, in said clamping direction 17. Said arms 26 and rack rail 25 of second blocking means 22b are then articulated about an axis orientated in the same direction.

Said locking means 23 are constituted, for example, by a finger 28, acting as a spring (not shown), bearing, directly or otherwise, in the area of lateral side members 14 of pod 11 in such a way that said finger forces the rotation of said arms 26 in the direction of arrow 29 in Fin. 4a and in the opposite direction in FIG. 4b and, consequently, the engagement with one another of racks 24, 25.

Said means 10, 10' for causing said pressing means 6 to change over from their open configuration to their product holding configuration, or vice versa, are constituted, for example:

by at least a first jack 30, secured to a fixed armature/reinforcement 31 in relation to which pods 11 travel, said first jack or jacks 30 being capable of acting on said locking means 23 to disengage said first and second locking means 22a, 22b and to leave them free in relation to one another, by second jacks 32 secured to said fixed armature 31, said second jacks 32 being capable of causing said carriages 15 to slide in said clamping direction 17 between said open configuration and said product holding configuration, or vice versa.

There are provided, in particular, two first jacks 30, that is to say one for each arm 26. The first jacks 30 have a rod 33 moving in directions 34 perpendicular to clamping direction 17 to force arms 26 to rotate in the direction opposite to that imposed thereupon by finger 28. The arms 26 take the form, of an L. The rod 33 of first jacks 30 acts on one of the ends of one of the arms of the L, while said finger 28 of locking means 23 acts on the other arm.

There is provided, for example, a said second jack 32 for each of carriages 15. The latter are driven by said second jacks 32 via a finger 35 cooperating with blocks 19 of said carriages 15.

Below is given a description, by way of example, of the operation of the means mentioned earlier upon the arrival of a car 11 at the input station or stations 3. Said cars 11 arrive empty, while carriages 15 are in their open configuration and racks 24, 25 are engaged with one another, through the action of finger 28. A set 2 of products 1 is introduced into said pod 11 between said pressure plates 18. Said first jacks 30 are then activated to unlock said racks 24, 25 and second jacks 32 cause carriages 15 to change over from their open configuration to their product holding configuration. First jacks 30 are deactivated to allow racks 24, 25 to re-engage with one another. Pod 11 is then allowed to travel.

As more particularly illustrated in FIG. 5, the device according to the invention can further include means 36 for adapting said product holding configuration. These can, for example, be stops 37, mobile in relation to said fixed armature 31, said stops 37 being able to limit the travel of said second jacks 32 so as to adjust the minimum spacing of said carriages 15.

To enable said stops 37 to be positioned, said device includes, in particular, a rail 38 for guiding them, parallel to said clamping direction 17, as well as a hand-wheel 39 and a rod 40, 40' for driving said stops 37. As more clearly apparent from FIGS. 4a and 4b, said stops 37 and said second jacks 32 cooperate with one another via a finger 41 secured to said second jack 32.

With regard to said input station or stations 3, the device according to the invention can also include means for retaining the products in pod 11 when they are introduced. These can, in particular, be a retractable stop 42 actuated by one or more jacks 43. This stop is activated when locking means 23 are neutralized by said first jacks 30, and de-activated in the contrary case. It is driven in the same direction 34 as rod 33 of said first jacks 30.

Figure 7:
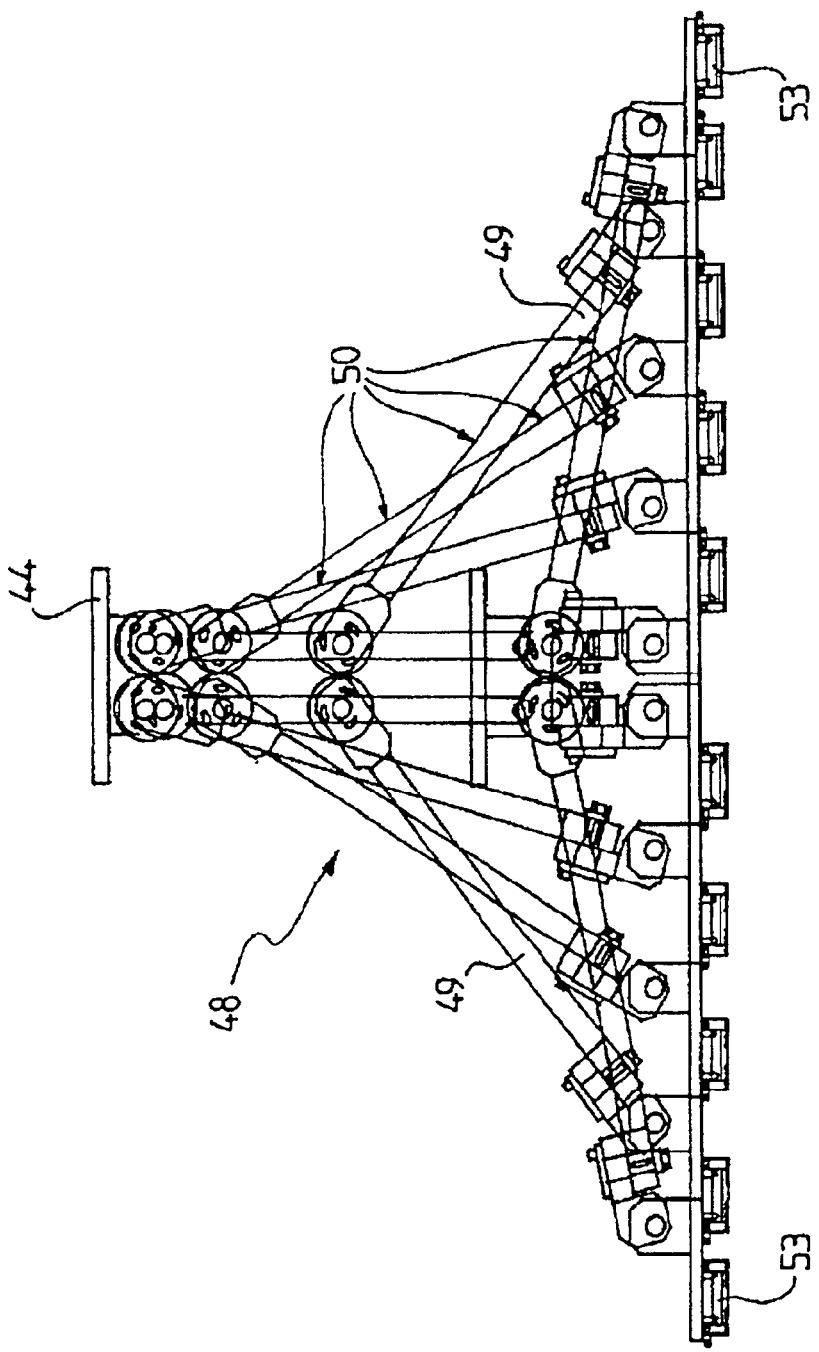
FIG. 7 is a top view illustrating the operating principle of the means shown in FIG. 6.

With reference, now, to FIGS. 6 and 7, it will be noted that said ejection means 7 include, for example, a thrust bearing 44 and means for displacing said thrust bearing in a first direction. The latter means are constituted by means 46 capable of generating a force in a second direction 47 substantially perpendicular to said first direction 45, and by means 48 for transmitting said force, cooperating with said stop 42.

Said first direction 45 is, for example, substantially parallel to the plane occupied by said support plate 13 for pods 11 and by said pressure plates 18 of carriages 15, when said pods are located at said input station or stations 4. Said second direction 47 is, in particular, substantially parallel to said clamping direction 17. It is thus possible to distribute the overall dimensions of ejection means 7 and to accommodate them in armature 31, on which they can then bear.

As more especially illustrated in FIG. 7, said transmission means 48 are constituted, in particular, by two arms 49, forming the two equal sides of an isosceles triangle 50 the axis of symmetry of which is defined by said first direction 45, and by means for bringing together/separating said arms 49 by deforming said triangle, while preserving its properties as an isosceles triangle and the orientation of its axis of symmetry. Said triangle 50 is deformed, for example, in the plane defined by said first and second directions 45, 47.

Said arms 49 have ends 51 cooperating with one another, for example via gears, in the area of said thrust stop 44. The opposite ends 52 of said arms 49 are mounted so as to articulate on skids 53, sliding over a rail 54 substantially perpendicular to the axis of symmetry of said isosceles triangle 50.

Said means 46 for generating a force are constituted, in particular, by at least one jack 55 driving said skids 54, directly or indirectly, for example via a transmission belt.

With further reference to FIG. 1, it will be noted that said means 9 for handling an accumulation of sets 2 are constituted, in particular, as mentioned earlier, by means for varying the length of the path followed by said transport means 8. Belt 12 of the latter then forms a loop having a fixed length to which said pods 11 are fastened, while allowing them to rock.

Said means for varying the length of the path of the sets are constituted, for example:

by a first pair of drums 56a, 56b, referred to as driving drums, serving to drive said belt 12, by means 57 for actuating said driving drums 56a, 56b, capable of operating them at two different respective speeds, by a second pair of drums 58a, 58b about which belt 12 passes, the first drum, 58a, and the second drum, 58b, of said second pair being provided respectively between the first driving drum 56a and the second driving drum 56b, and between the second driving drum 56b and the first driving drum 56a, depending on the direction of travel of belt 12, said first drum 58a and second drum 58b of said second pair being kept at a constant distance from one another and said second pair being mobile in relation to said first pair.

Said driving drums 56a, 56b are secured, for example, to said armature 31, while said second pair of drums 58a, 58b is mobile in relation thereto in particular via rails, not shown, in which the ends of their pivotal axes move. According to the example presented, said second pair of drums moves vertically.

The device according to the invention can also include another pair of fixed drums, 59a, 59b, enabling the path between input station or stations 3 and output station or stations 4 to be lengthened while limiting the space requirements of the device. They are located on either side of first drum 58a of said second pair.

The operation of the means mentioned above will be described below by way of example. When the two driving drums 56a, 56b operate at the same speed, drums 58a, 58b of said second pair stay at the same level and the number of pod 11 that accumulate is constant. When driving drum 56a located on input station 3 side is in operation while driving drum 56b located on output station 4 side is halted, said second pair of drums 58a, 58b descends and the number of pods 11 that accumulate increases. When driving drum 56a located on input station 3 side is halted and driving drum 56b located on output station 4 side is in operation, said second pair of drums 58a, 58b rises and the number of pods that accumulate decreases.

This being the case, to permit the introduction and the ejection of sets 2, the device according to the invention can operate step by step.

Armature 31 serving to support the different means of the invention is constituted, in particular, by a set of tubular beams 60 assembled to one another.

Other forms of embodiment, within the grasp of a man of the art, could, of course, have been contemplated without thereby departing from the scope of the invention.

I claim:

1. A device for on-line storage of sets of flat products comprising:

an input station;

an output station;

a means for conveying the sets between said input station and said output station;

a pressing means for moving with said means for conveying, said pressing means for changing from an open configuration permitting an introduction of the sets into said means for conveying at a given input rate, to a holding configuration in which the flat products are pressed against one another;

a means for causing said pressing means to change over from said open configuration to said holding configuration, said means for causing provided at said input station;

a means for ejecting the sets provided at said output station for ejecting the sets at a given output rate; and a means for generating an accumulation of the sets between said input station and said output station as a function of said rate of input or said rate of output, said means for conveying having a plurality of pods, each of said plurality of pods being capable of accommodating at least one set of the sets of flat products, said pressing means having two carriages slidable toward each other on the pod, said pressing means having a means for holding said two carriages spaced apart by a given distance, said means for holding the carriages comprising first and second blocking means capable of engaging with one another, said first blocking means being secured to said carriage, said second blocking means being articulated in relation to said pod, said means for holding the carriages having a locking means borne by said pod, said locking means for forcing an engagement of said second blocking means with said first blocking means.

2. The device according to claim 1, said means for conveying moving along a looped path, the device further comprising means for causing said pressing means to change over from said holding configuration to said open configuration provided in a direction of progress of said means for conveying between said output station said input station.

3. The device according to claim 2, said means for causing said pressing means to change over from said holding configuration to said open configuration being provided in an area of said output station.

4. The device according to claim 1, said means for causing said pressing means to change over from said open configuration to said holding configuration comprising:

a first jack secured to an armature fixed in relation to which the pod travels, said first jack being capable of acting upon said locking means to disengage said first and second blocking means and leave them free in relation to one another; and a second jack secured to said armature said second jack being capable of causing said two carriages to slide toward each other between said open configuration and said holding configuration.

5. The device according to claim 4, further comprising:

means for adapting said product holding configuration to a size of the sets of flat products.

6. The device according to claim 5, said means for adapting said product holding configuration is comprised by stops that are mobile in relation to said fixed armature, said stops being capable of limiting a travel of said second jack so as to adjust the minimum spacing of said carriages.

7. A device for on-line storage of sets of flat products comprising:

an input station;

an output station;

a means for conveying the sets between said input station and said output station;

a pressing means for moving with said means for conveying, said pressing means for changing from an open configuration permitting an introduction of the sets into said means for conveying at a given input rate, to a holding configuration in which the flat products are pressed against one another;

a means for causing said pressing means to change over from said open configuration to said holding configuration, said means for causing provided at said input station;

a means for ejecting the sets provided at said output station for ejecting the sets at a given output rate; and a means for generating an accumulation of the sets between said input station and said output station as a function of said rate of input or said rate of output, said means for ejecting comprising a thrust bearing and a means for displacing said thrust bearing in a first direction, said means for displacing comprising means for generating a force in a second direction substantially perpendicular to said first direction and by a means for transmitting said force, said means for generating the force cooperating with said thrust bearing.

8. The device according to claim 7, in which said means for transmitting the force comprising two arms forming two equal sides of an isosceles triangle, said isosceles triangle having axis of symmetry which is defined by said first direction and by means for bringing together or separating said arms by deforming said triangle while preserving the shape of the isosceles triangle and the orientation of said axis of symmetry.

9. The device according to claim 8, said arms having ends cooperative with one another in the area of said thrust bearing, said arms having opposite ends mounted so as to be articulated on skids sliding on a rail substantially perpendicular to the axis of symmetry of said isosceles triangle.

10. The device according to claim 9, said means for generating the force comprising at least one jack driving said skids.

11. The device according to claim 10, said means for generating the accumulation of sets comprising means for varying a length of the path taken by said means for conveying.

12. The device according to claim 11, said means for conveying comprising at least one belt forming a loop of a fixed length, said means for varying the length of the path comprising:

a first pair of driving drums drivingly connected to said belt;

a means for actuating said first pair of driving drums; and a second pair of drums about which said belt travels, the first drum and a second drum of said second pair being respectively provided between the first driving drum and the second driving drum and between the second driving drum and the first driving drum, said first drum and second drum of said second pair being held at a constant distance from one another, said second pair of drums being mobile in relation to said first pair of driving drums.

* * * * *